US006471090B1

(12) United States Patent
Inamura et al.

(10) Patent No.: US 6,471,090 B1
(45) Date of Patent: Oct. 29, 2002

(54) MEDICINE SUPPLY APPARATUS

(75) Inventors: Atsuo Inamura, Gunma (JP); Koichi Kobayashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/555,177

(22) PCT Filed: Sep. 21, 1999

(86) PCT No.: PCT/JP99/05133

§ 371 (c)(1),
(2), (4) Date: May 24, 2000

(87) PCT Pub. No.: WO00/18644

PCT Pub. Date: Apr. 6, 2000

(30) Foreign Application Priority Data

Sep. 29, 1998 (JP) .......................................... 10-275621
Sep. 29, 1998 (JP) .......................................... 10-275643

(51) Int. Cl.$^{7}$ ................................................ B65G 59/00

(52) U.S. Cl. ....................... 221/124; 221/197; 221/258; 221/265; 221/287

(58) Field of Search ................................ 221/124, 129, 221/197, 287, 263, 264, 265, 258, 2, 6

(56) References Cited

U.S. PATENT DOCUMENTS 4,573,606 A * 3/1986 Lewis et al. ................... 221/2
4,664,289 A * 5/1987 Shimizu et al. ................ 221/2
5,348,061 A * 9/1994 Riley et al. ................. 221/2 X
5,667,096 A * 9/1997 Wu .............................. 221/6
5,901,876 A * 5/1999 Yuyama et al. ......... 221/124 X

FOREIGN PATENT DOCUMENTS

JP 57-5282 2/1982
JP 63-11253 3/1988

* cited by examiner

*Primary Examiner*—David H. Bollinger
(74) *Attorney, Agent, or Firm*—Darby & Darby

(57) ABSTRACT

There is disclosed a medicine supply apparatus which improves the cost and operability required for the maintenance of individual tablet cases. In the medicine supply apparatus, a plurality of tablet cases are stored in a main body case storage part, each tablet case includes a container for containing a medicine and provided with a discharge drum for discharging the medicine and a drive table provided with a motor for driving the discharge drum, transmission mechanism for transmitting a motor drive force to the discharge drum and a medicine detection sensor for detecting the medicine discharged from the discharge drum, and the drive table and container are detachably attached to the tablet case.

5 Claims, 14 Drawing Sheets

FIG.10

| | (1) 540/360 | (2) 500/320 | (3) 460 | (4) 420/280 |
|---|---|---|---|---|
| MAIN BODY | 90*2+90*2=360 | 90*2+70*2=320 | 90*2+70*2=320 | 70*2+70*2=280 |
| MAIN BODY + EXTENSION UNIT | 360+90*2=540 | 320+90*2=500 | 320+70*2=460 | 280+70*2=420 |
| S-TABLET CASE (250cc) | 100% | 72/56% | 39% | 0 |
| L-TABLET CASE (500cc) | 0 | 28/44% | 61% | 100% |
| AVERAGE CAPACITY | 250cc | 320/360cc | 400cc | 500cc |

MEDICINE SUPPLY APPARATUS

TECHNICAL FIELD

The present invention relates to a medicine supply apparatus which supplies medicine contained in a tablet case to a container (phial, bag), and the like by the quantity designated by a prescription in a hospital, and the like.

BACKGROUND ART

In hospitals or pharmacies, for example, as described in Japanese Utility Model Publication No. 5282/1982 (B65B1/30), a medicine supply apparatus (referred to as a tablet packing machine in the publication) has been heretofore used to dispense the medicine prescribed by a doctor to a patient. In such system the quantity described in the prescription of the medicines (tablets, capsules, and the like) is discharged from a discharge drum (referred to as an alignment board in the above-described publication) in the tablet case one by one, subsequently collected by a hopper and packed.

Moreover, for example, in Japanese Patent Publication No. 11253/1988, the discharge drum and a motor for driving the drum are disposed on the side of the tablet case (referred to as a tablet supply apparatus), and such constitution can simplify a structure on the side of a tablet supply apparatus main body.

However, when the container for containing the tablet, discharge drum, motor, and the like are integrally constituted as described in the latter publication, the costs of the individual tablet cases increase, so that when a trouble is caused in any of the cases and exchange is necessary, the maintenance/exchange cost soars.

Moreover, since the internal structure of the tablet case single unit is complicated, the repair disadvantageously becomes difficult.

On the other hand, in recent years, there has been a demand for enhancement of space efficiency even in hospitals or pharmacies, and it is urgently necessary to enlarge the capacity without enlarging the installation space of the medicine supply apparatus. On the other hand, the Japanese Utility Model Publication No. 5282/1982 is designed so that a supplementary stand can additionally be installed.

However, the increase of storage capacity is limited even in such constitution. Therefore, it has been urgently necessary to improve the tablet containing efficiency with respect to the entire dimension in the individual tablet cases (referred to as the medicine supply apparatus) as shown in the Japanese Patent Publication No. 11253/1988.

The present invention has been developed to solve such conventional technical problem, and provides a medicine supply apparatus which improves the cost and operability required for the maintenance of the individual tablet cases.

The present invention further provides a medicine supply apparatus which improves the capacity efficiency of each tablet case.

DISCLOSURE OF THE INVENTION

The medicine supply apparatus of the present invention comprises a plurality of tablet cases stored in a main body case storage part, each tablet case includes a container for containing a medicine and provided with a discharge drum for discharging the medicine, and a drive table provided with a motor for driving the discharge drum, a transmission mechanism for transmitting a motor drive force to the discharge drum and a medicine detection sensor for detecting the medicine discharged from the discharge drum, and the drive table and container are detachably attached to the tablet case.

Moreover, the medicine supply apparatus of the present invention is constituted by storing a plurality of tablet cases in a main body case storage part, each tablet case includes a container for containing a medicine and a discharge drum for discharging the medicine from the container, and the discharge drum of the tablet case is dislocated toward one lower side of the container.

Furthermore, in the above-described medicine supply apparatus of the present invention, the motor for driving the discharge drum is disposed on the other lower side of the container.

Additionally, in the above-described medicine supply apparatus of the present invention, one side of the container corresponds to a main body side.

BRIEF DESCRIPTION OF THE DRAWINGS

FIG. 10 is a diagram showing the number and size proportion of the tablet cases in the respective storage modes of FIG. 9.

BEST MODE FOR CARRYING OUT THE INVENTION

Figure 1:
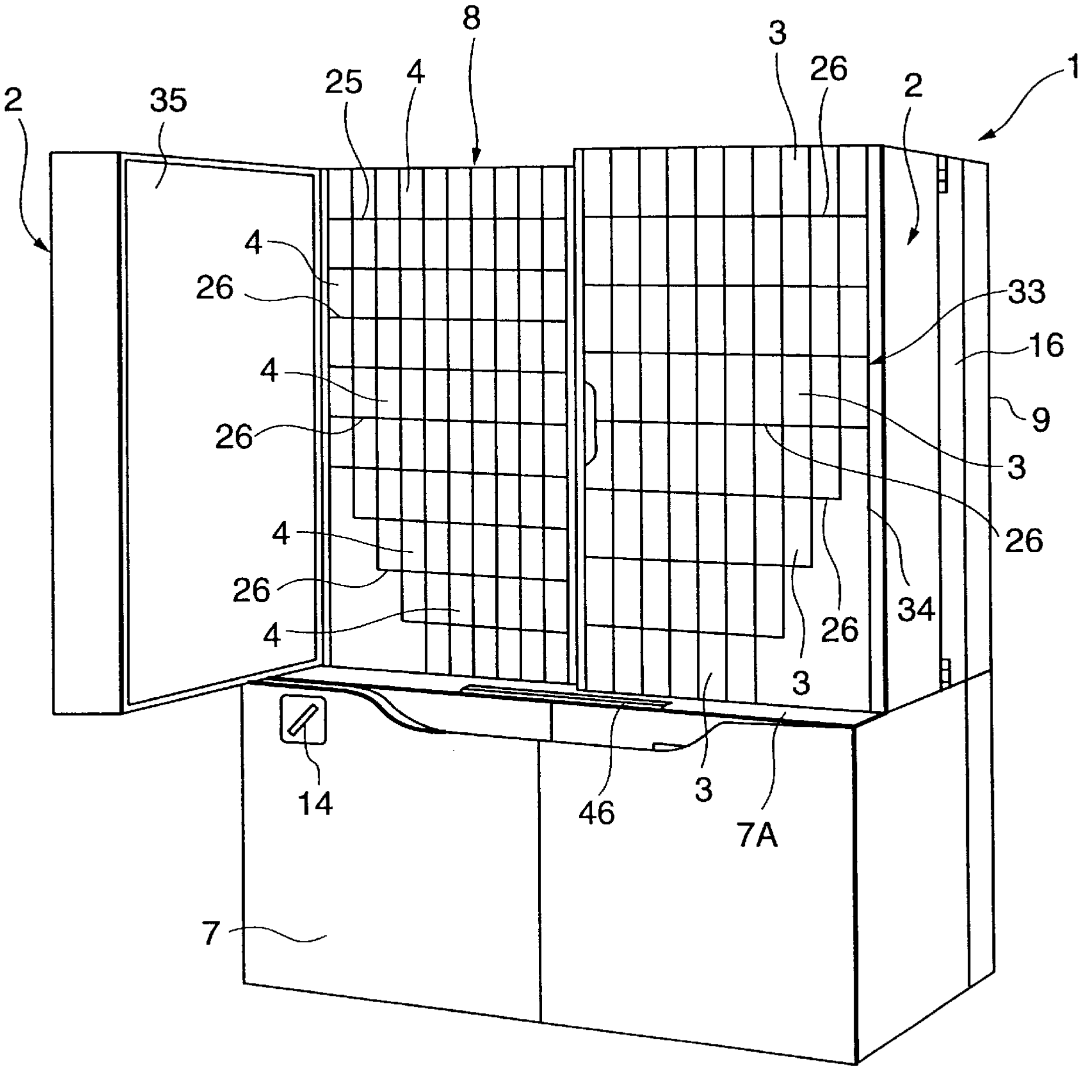
FIG. 1 is a perspective view of the medicine supply apparatus of the present invention when one door unit is open.
Figure 2:
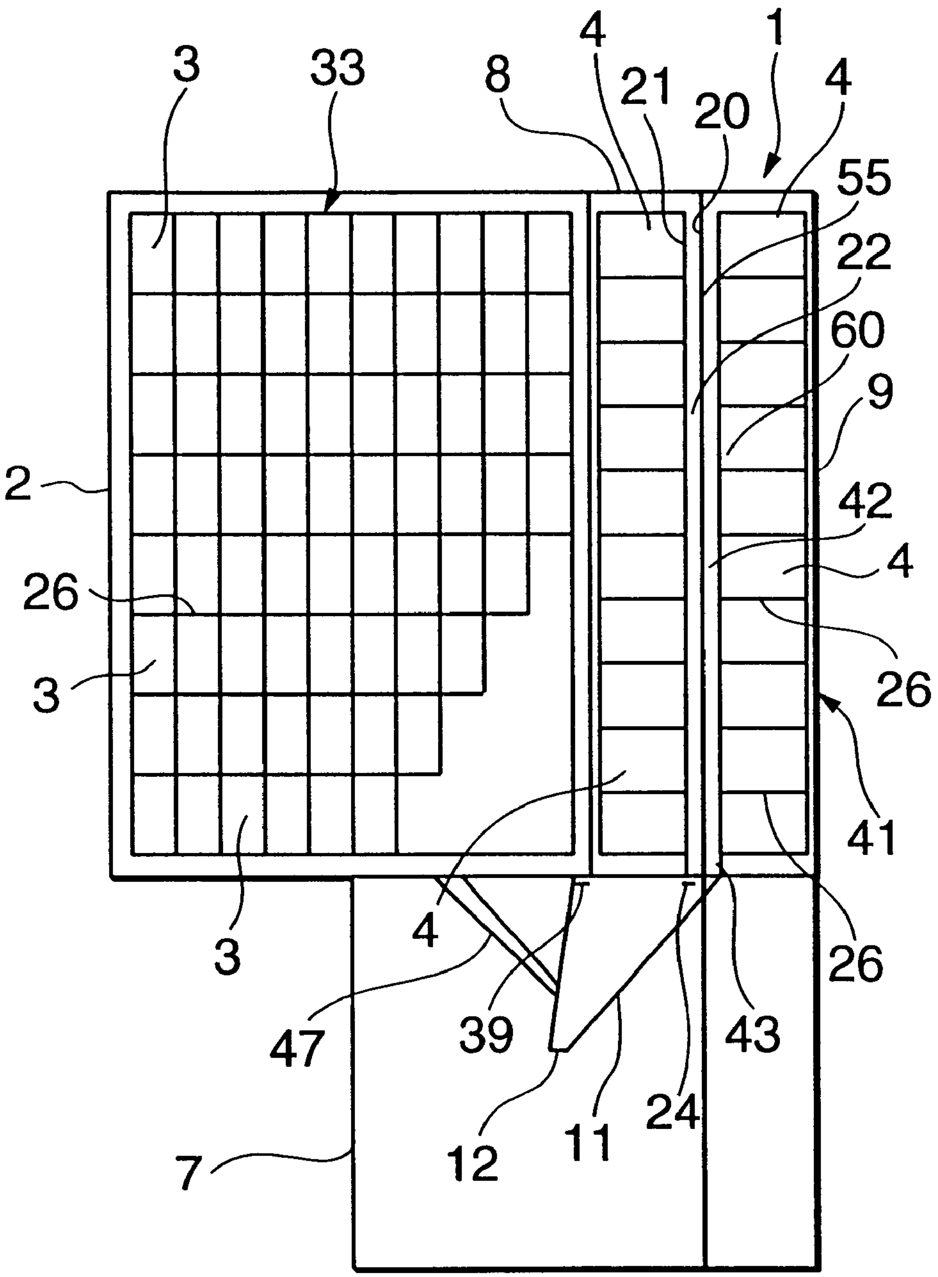
FIG. 2 is a partially perspective side view of the medicine supply apparatus when the other door unit is open.
Figure 3:
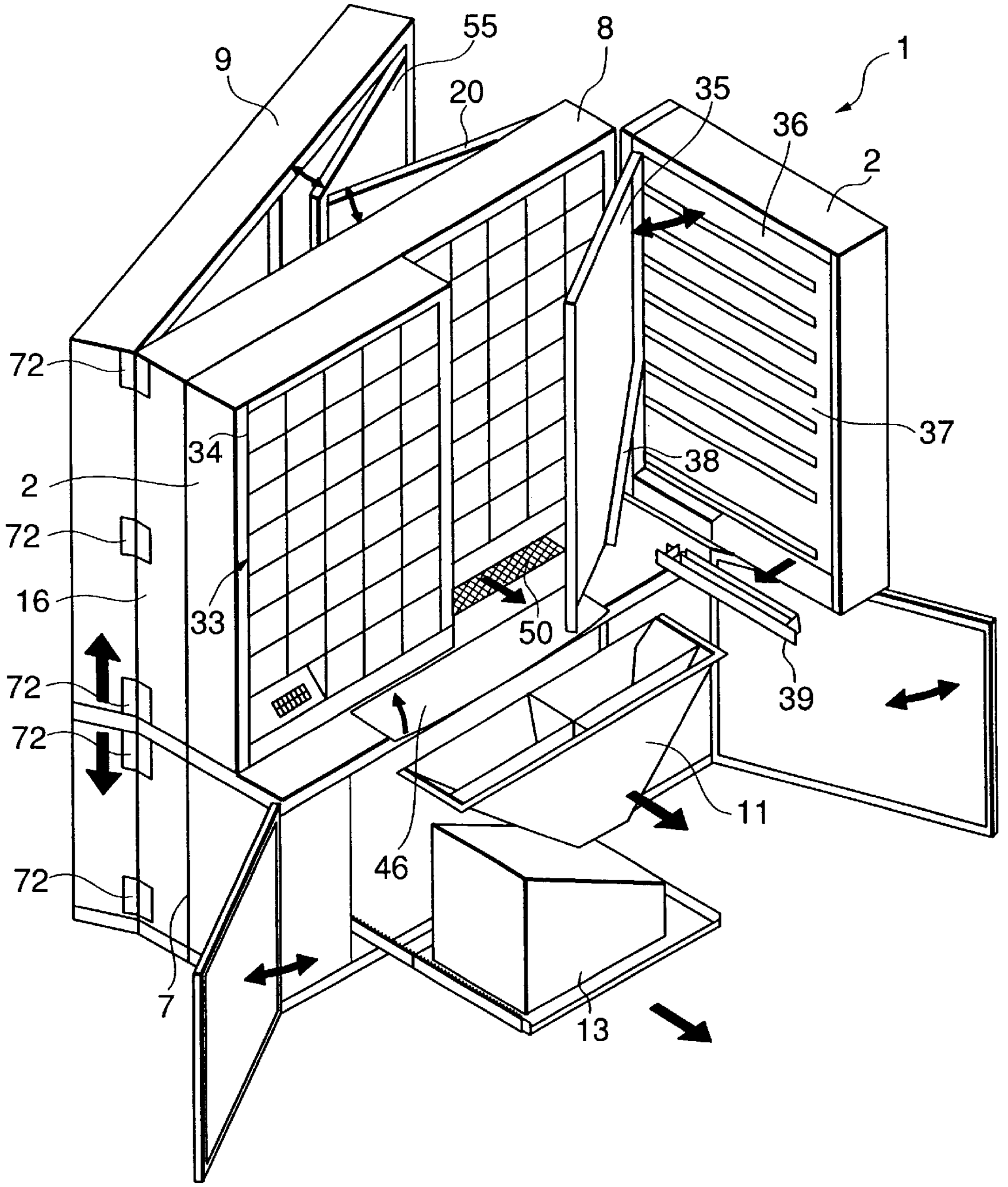
FIG. 3 is a perspective view showing the internal structure of the medicine supply apparatus of the present invention.
Figure 4:
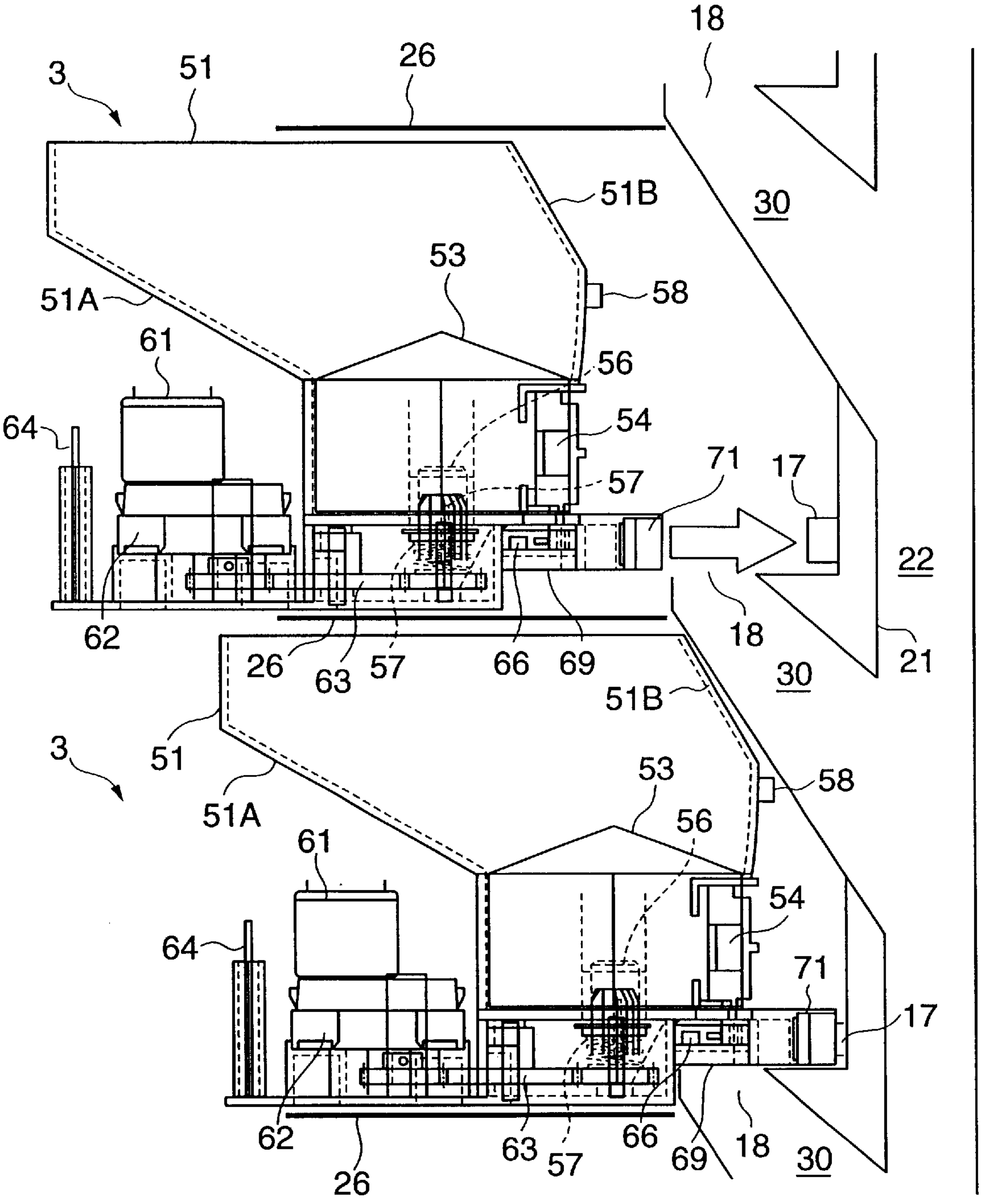
FIG. 4 is an enlarged longitudinal side view of the medicine supply apparatus showing a shelf part.
Figure 5:
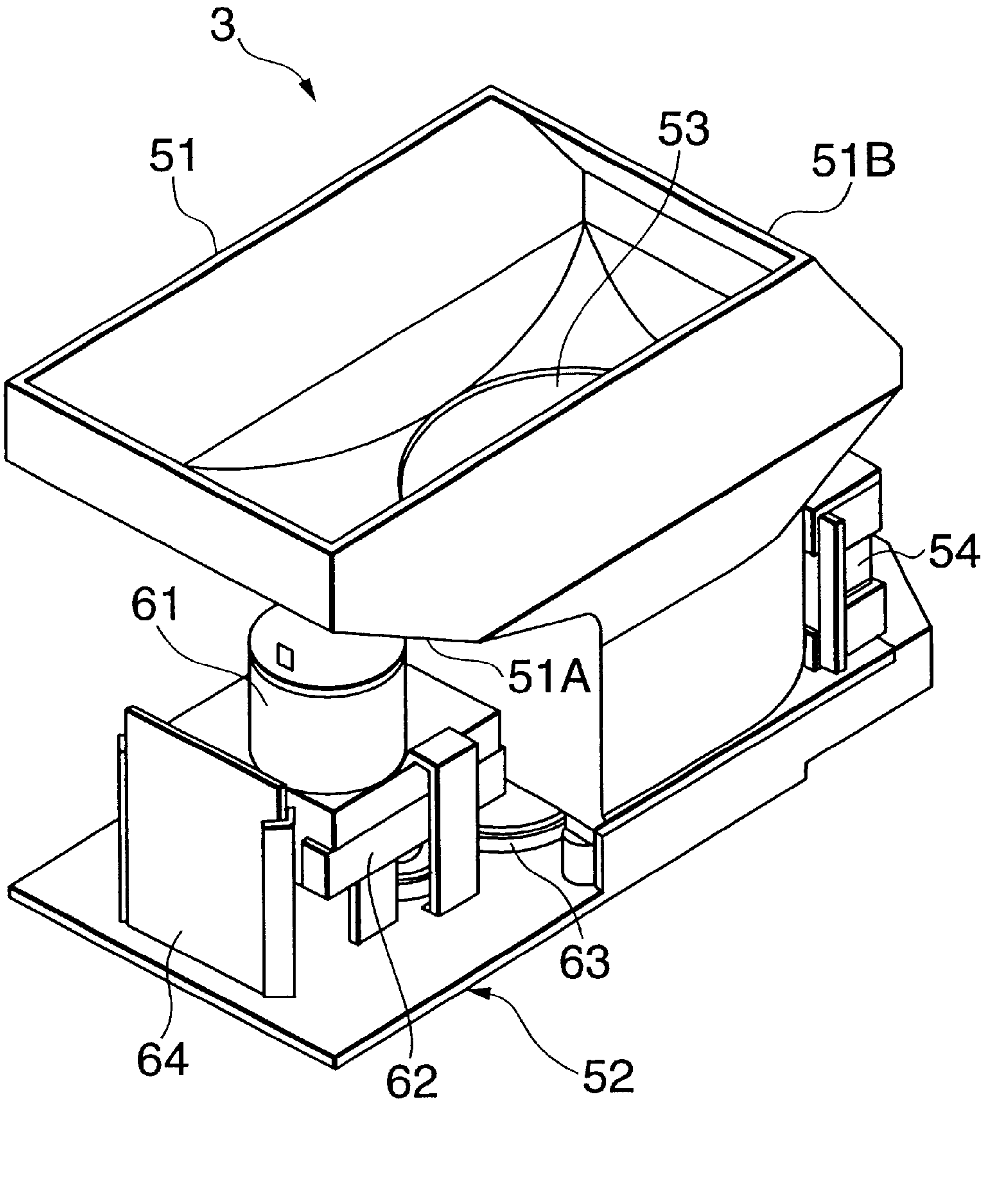
FIG. 5 is a perspective view of a tablet case.
Figure 6:
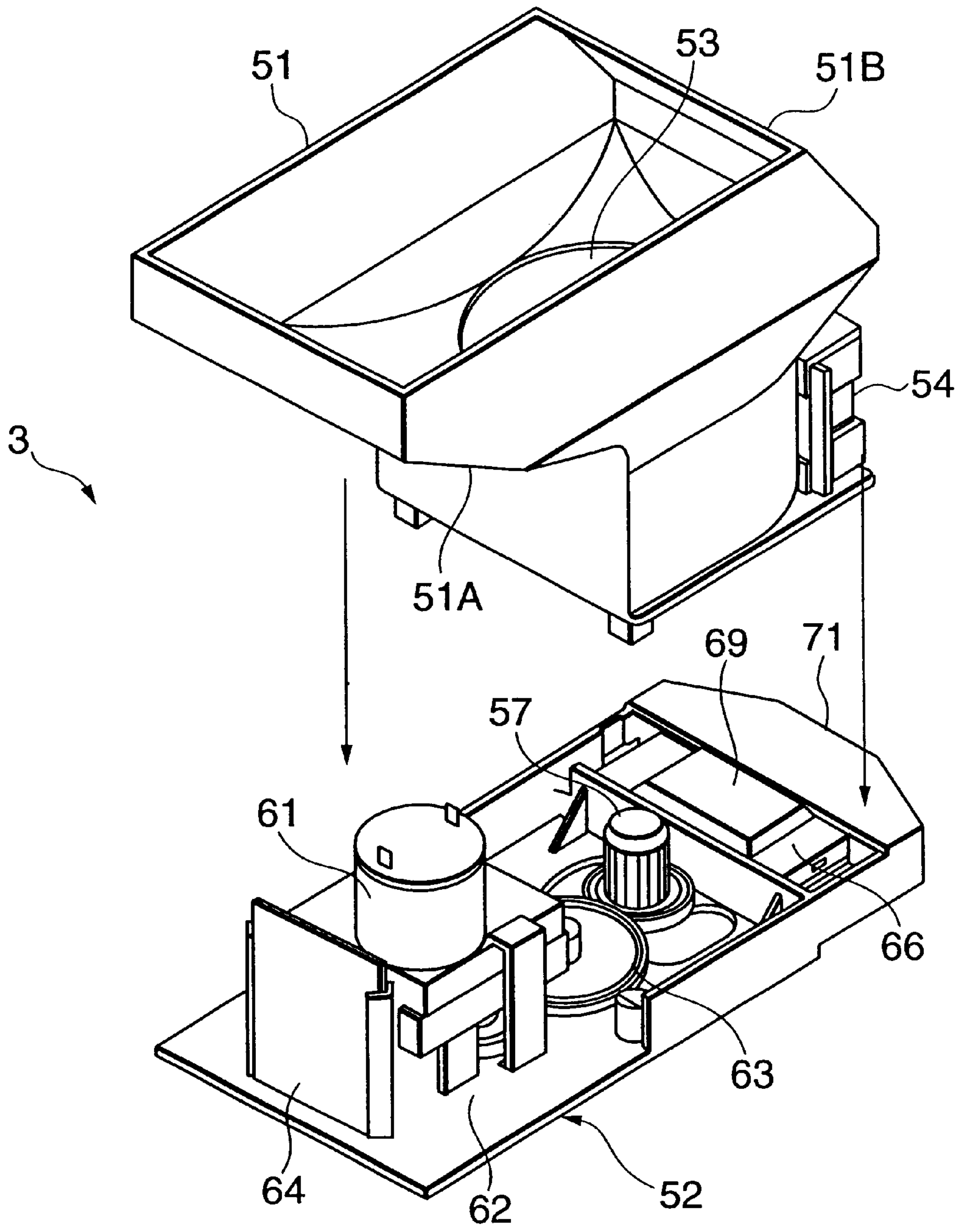
FIG. 6 is an exploded perspective view of the tablet case.
Figure 7:
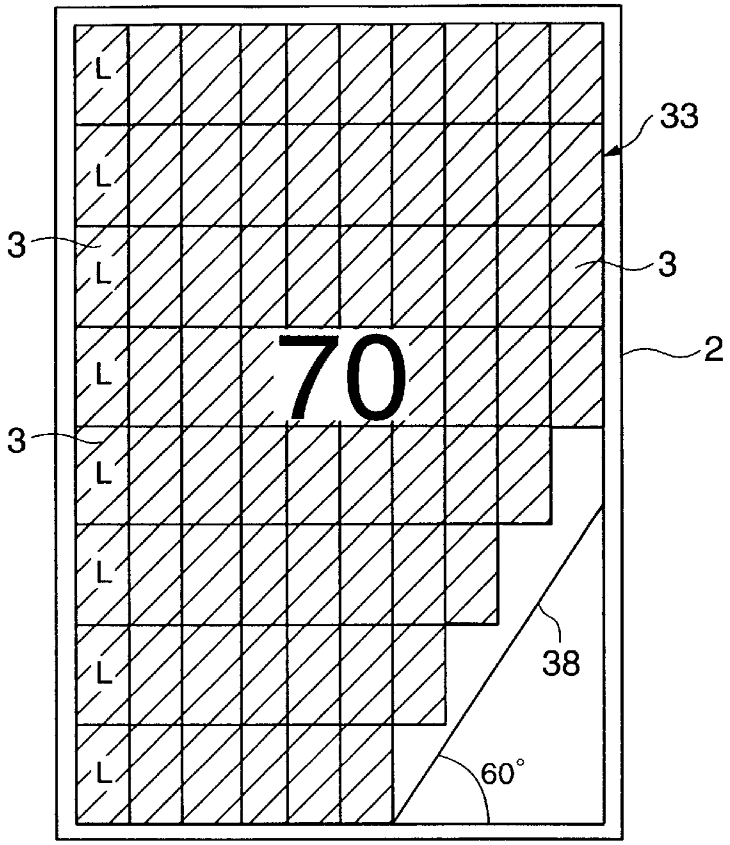
FIG. 7 is a front view of a door-side case storage part which stores only a large-capacity tablet case.

An embodiment of the present invention will be described hereinafter in detail with reference to the drawings. FIG. 1 is a perspective view of a medicine supply apparatus 1 of the present invention when one door unit 2 is open, FIG. 2 is a partially perspective side view of the medicine supply apparatus 1 when the other door unit 2 is open, FIG. 3 is a perspective view showing the internal structure of the medicine supply apparatus 1 of the present invention, FIG. 4 is an enlarged longitudinal side view of the medicine supply apparatus 1 showing a shelf part 26, FIG. 5 is a perspective view of a tablet case 3, and FIG. 6 is an exploded perspective view of the tablet case 3 with a large capacity (L).

The medicine supply apparatus 1 of the present invention is installed in a hospital, a pharmacy, and the like, and is constituted of: a main body 7 having a laterally long rectangular shape; a main body side case storage part 8 vertically mounted on the back part of a top surface 7A of the main body 7; door units 2, 2 which openably close the front face opening of the main body side case storage part 8 and are movable in a double swinging system; an extension unit 9 attachable/detachable to the back face of the main body 7 and optionally attached as occasion demands; and the like.

A hopper 11 extended/opened upward is disposed in the upper part of the main body 7, and a shutter 12 is attached to the lower end of the hopper 11. Moreover, a packing machine 13 is disposed below the hopper 11 in the main body 7, and the medicine discharged from the hopper 11 is packed in obliquely disposed rolled packing paper (not shown) and discharged from a taking port 14.

On the other hand, the main body side case storage part 8 has an opening in its front face, and at least left and right side faces are closed by transparent walls 16 of glass, resin, or the like. Moreover, a main body side chute 22 is vertically defined over the entire width between a partition plate 21 and a back plate 20 at the back of the main body side case storage part 8.

In the both side lower parts of this main body side chute 22, inclined bottom faces 23, 23 (FIG. 8) are formed to be narrowed and inclined toward both sides of the upper edge of the hopper 11 from the left and right ends of the main body side case storage part 8. There is an opening to the upper part of the hopper 11 between the bottom faces 23, 23, and a shutter 24 is attached to the top surface 7A of the main body 7 in a position opposite to the opening.

Moreover, a plurality of shelves 26 are extended on the above-described partition plate 21, and tablet cases are attached to the shelves 26 as described later. In the inner side part of the respective shelves 26, a plurality of paths 30 each having an opening 18 in its top surface are formed to extend from left to right at predetermined intervals. This path 30 is inclined to be low toward the inside and connected to the main body side chute 22, and a connector 17 is disposed on the partition plate 21 positioned inside each opening 18.

A large-capacity (L) tablet case 3, and a small-capacity (S) tablet case 4 are prepared as the tablet case, the capacity of the tablet case 3 is set to 500 cc in the embodiment, and the capacity of the tablet case 4 is set to 250 cc. Moreover, since the structure of the tablet case 3 is different from that of the tablet case 4 only in the vertical dimension of a container 51 described later (the tablet case 4 is small), the tablet case 3 will be described hereinafter.

As shown in FIGS. 5 and 6, the tablet case 3,is constituted of a container 51 formed of transparent hard synthetic resin, and a drive table 52. The container 51 has an opening in its top surface, and the medicine is supplied via this opening. Moreover, a discharge drum 53 is rotatably attached to a position which deviates to the inner side in the lower part of the container 51. The top surface of the discharge drum 53 is formed in a conical surface whose middle is raised, and a plurality of vertical grooves (not shown) are further formed in the side face. The medicines entering the grooves are discharged one by one with the rotation of the discharge drum 53. An engagement hole 56 for engaging with a drive shaft 57 as described later is formed in the middle of the bottom face of the discharge drum 53.

Additionally, numeral 54 denotes a brush for vertically partitioning the groove to discharge the medicines one by one. Moreover, a side face 51A on the front side of the container 51 is inclined so that the inner side is lowered toward the discharge drum 53. Moreover, a side face 51B on the inner side of the container 51 is slightly inclined so that the lower side is directed inwardly along the path 30. Moreover, a residual amount sensor 58 constituted of a reflective infrared ray photo sensor is attached to the lower part of the side face 51B. Additionally, the residual amount sensor 58 is attached to two types of cassettes constituted for the tablet case 3 and tablet case 4, and positioned at a predetermined height from the top surface of the discharge drum 53 by detachably attaching the cassette to the container 51.

On the other hand, on the drive table 52, a motor 61 positioned on the front side, a reduction gear box 62 for decelerating the rotation of the motor 61, the drive shaft 57 positioned on the inner side, a transmitting gear (transmission mechanism) 63 disposed between the reduction gear box 62 and the drive shaft 57, a substrate 64, a medicine detection sensor 66 constituted of a photo sensor, and the like are attached.

The substrate 64 is provided with a display (LED) 67, a memory 68, and the like as described later, and vertically mounted on the forefront side of the drive table 52. Moreover, a rectangular discharge port 69 is vertically formed through the inner part of the drive table 52, and the medicine detection sensor 66 is attached to the periphery of the discharge port 69 to detect the medicine passed through the discharge port 69. Moreover, a connector 71 is formed on the inner side face of the drive table 52, and connected to the motor 61 and substrate 64.

Moreover, the container 51 is detachably attached to the drive table 52 from above. Additionally, both are bonded to each other by screws, or by disengageable engagement. In this case, the drive shaft 57 enters to engage in the engagement hole 56 of the discharge drum 53, and the discharge port 69 is disposed opposite to the, groove lower side of the discharge drum 53. Moreover, the residual amount sensor 58 is connected to the connector 71 and substrate 64, and the motor 61 is positioned below the side face 51A of the container 51. Thereby, a dead space below the inclined side face 51A is utilized to dispose the motor 61, the capacity of the container 51 is secured, and the entire dimension of the tablet case 3 is reduced.

Moreover, by disposing the motor 61, and the like on the side of the tablet case 3, the shelf 26 of the main body side case storage part 8 can be thinned, so that the simplification of the structure on the case storage part side and the increase of the number of the tablet cases 3 (or 4) to be stored are realized. Furthermore, since the container 51 and drive table 52 are constituted as separate bodies, and attachable/detachable to each other, in case of the failure of the drive table 52, the table can be repaired in a detached state from the container 51.

Moreover, when exchange is necessary, the drive table 52 and container 51 can separately be exchanged, so that the maintenance property is improved, and the cost during the exchange can be reduced.

Moreover, such tablet cases 3, 4 are arranged on the shelves 26. In this case, as shown in FIG. 4 the substrate 64 of the tablet case 3 (or 4) is disposed on the front side, the discharge port 69 is disposed on the inner side, the tablet case is inserted into the shelf 26 from the front side as shown by an arrow, and the connector 71 is detachably inserted/connected into the connector 17 on the side of the main body 7. Thereby, the drive table 52 is connected to the electric circuit on the side of the main body 7.

Moreover, the discharge port 69 is disposed opposite to the opening of the path 30, so that the medicines discharged one by one from the discharge drum 53 enter the path 30 from the opening 18 via the discharge port 69, and are passed through the path and dropped to the main body side chute 22. Furthermore, since the discharge drum 53 is displaced to the lower side and inner side of the container 51, with the tablet case 3 attached as shown in FIG. 4, the discharge port 69 is positioned on the side of the main body side chute 22. Therefore, the path 30 between the main body side chute 22 and the discharge port 69 can be shortened, so that the capacity efficiency by the reduction of an ineffective capacity can be improved, and the time necessary for medicine discharge can be shortened.

On the other hand, door side case storage parts 33 are formed in the door units 2, 2, respectively. The respective door side case storage parts 33, 33 have openings in front faces, and the front face openings are openably closed by transparent doors 34. Moreover, the left/right side face is covered with a steel plate, and the like. On the left/right side face a plurality of shelves 26 structured similarly as described above are vertically extended at predetermined intervals.

Moreover, door side chutes 37 are vertically defined over the entire width of the respective door units 2, 2 between a front side partition plate 36 and a back plate 35 at the back of the door side case storage parts 33, 33. Bottom faces 38, 38 are formed on the lower parts of the respective door side chutes 37, 37 so that the faces are narrowed and inclined toward both sides of the upper edge of the hopper 11. Furthermore, while the respective door units 2, 2 close the front face openings of the main body side case storage part 8, an opening is disposed above the hopper 11 via the through hole of the top surface 7A between both bottom faces 38, 38, and a shutter 39 is attached to the top surface 7A in a position opposite to the opening.

The partition plate 36 of each of the door side case storage parts 33, 33 is provided with the structure similar to the above-described structure (opening 18, path 30, connector 17), and a plurality of tablet cases 3 (or 4) are attached to the shelves 26 in a similar manner. Additionally, the path 30 of the door side case storage part 33 is connected to the door side chute 37.

Moreover, the top surface 7A of the main body 7 positioned on the front side while the door units 2, 2 are closed is provided with an additional medicine feeder 46 for arbitrarily supplying additional medicines, and a path 47 extends to the hopper 11 from the feeder 46. additionally, numeral 45 denotes the cover of the feeder 46. Moreover, numeral 50 denotes a cover for closing the through hole (for connecting the door side chute 37 to the hopper 11) of the top surface 7A when the door units 2, 2 are opened.

On the other hand, the extension unit 9 is attached to the back face of the main body 2, for example, in accordance with the scale enlargement of the hospital, and the like to add the tablet cases 3, 4, and its upper part is provided with an extension side case storage part 41. The left/right side face of the extension side case storage part 41 is also closed by the transparent wall of glass or resin, and the similar shelves 26 are extended in the extension side case storage part 41.

Moreover, an extension side chute 42 is vertically defined over the entire width between a front plate 55 and a partition plate 60 in the front part of the extension side case storage part 41. Also on the both side lower parts of the extension side chute 42, bottom faces are formed to be narrowed and inclined toward both sides of the upper edge of the hopper 11 from the left and right ends of the extension side case storage part 41. Furthermore, while the extension unit 9 is attached to the main body 2, the opening between both bottom faces is associated with a through hole formed in the back face of the main body 2 positioned on the upper end back part of the hopper 11, the extension side chute 42 is therefore connected to the hopper 11, and a shutter 43 having a structure similar to the above-described structure is attached to the opening.

Furthermore, the partition plate 60 of the extension side case storage part 41 is provided with a structure similar to the above-described structure (opening 18, path 30, connector 17), and a plurality of tablet cases 3 (or 4) are also attached to the shelves 26 in a similar manner. Additionally, the path 30 of the extension side case storage part 41 is connected to the extension side chute 42. Moreover, the extension unit 9 attached to the main body 2 is electrically connected to the main body side.

Additionally, the extension unit 9 is rotatably supported on the main body 7 via a hinge 72, further the front plate 55, back plates 20, 35 can freely be opened/closed, and the maintenance property is enhanced. Furthermore, the hopper 11 and packing machine 13 can freely be drawn from the main body 7 (FIG. 3).

Figure 11:
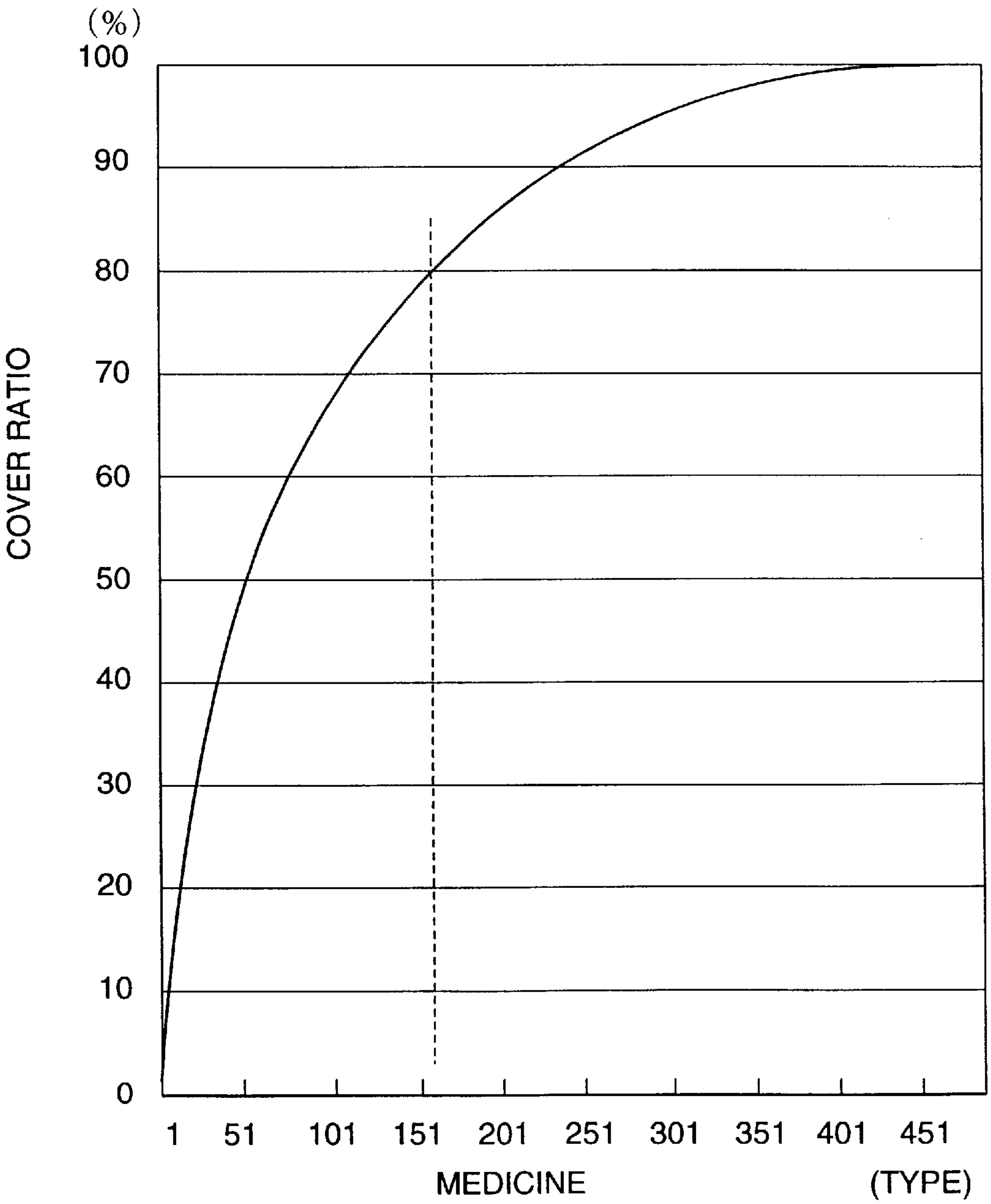
FIG. 11 is a diagram showing the relation between the number of medicine types and the ratio with which the actual operation can be covered.

Here, it is inspected with reference to FIGS. 7 to 12 whether either of large and small tablet cases 3, 4 is stored in the respective case storage parts 8, 33, 33, 41. Additionally, FIG. 11 is a graph showing the operation which can be covered by medicine types (substantially corresponding to the number of tablet cases), and as apparent from this drawing 80% of the medicine supply operation can be handled if 150 types of medicines can be contained.

Figure 12:
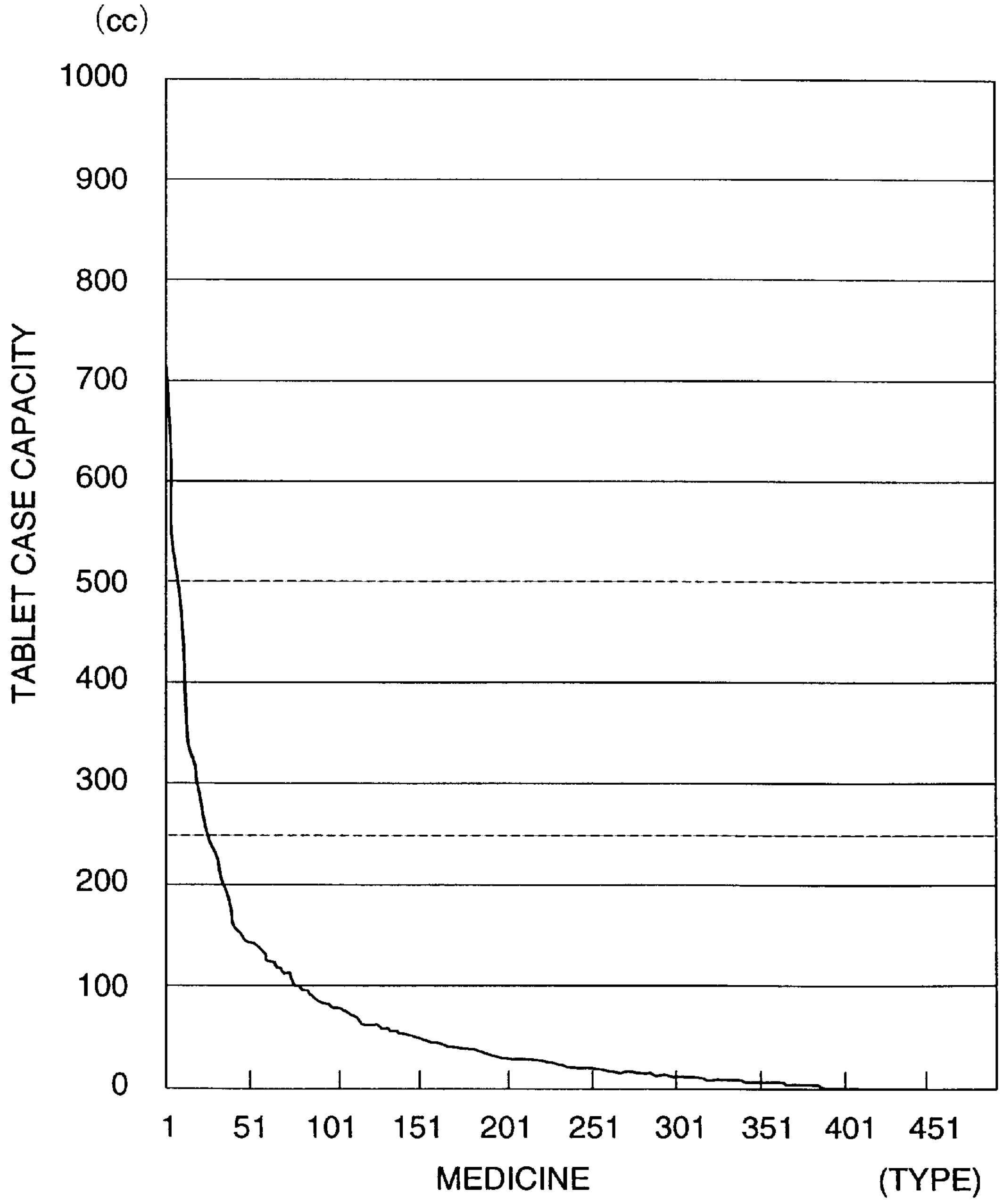
FIG. 12 is a diagram showing the relation between the number of medicine types and the capacity of a tablet case.

Moreover, FIG. 12 shows the relation between the medicine types and the tablet case capacity, and it can be seen that most of the medicines can be handled with 250 cc, and that when the capacity is 500 cc, by using two tablet cases, a necessary medicine of 1000 cc can also be handled. Therefore, as described above the capacity of the tablet case 3 is set to 500 cc in the embodiment, and the capacity of the tablet case 4 is set to 250 cc.

Figure 8:
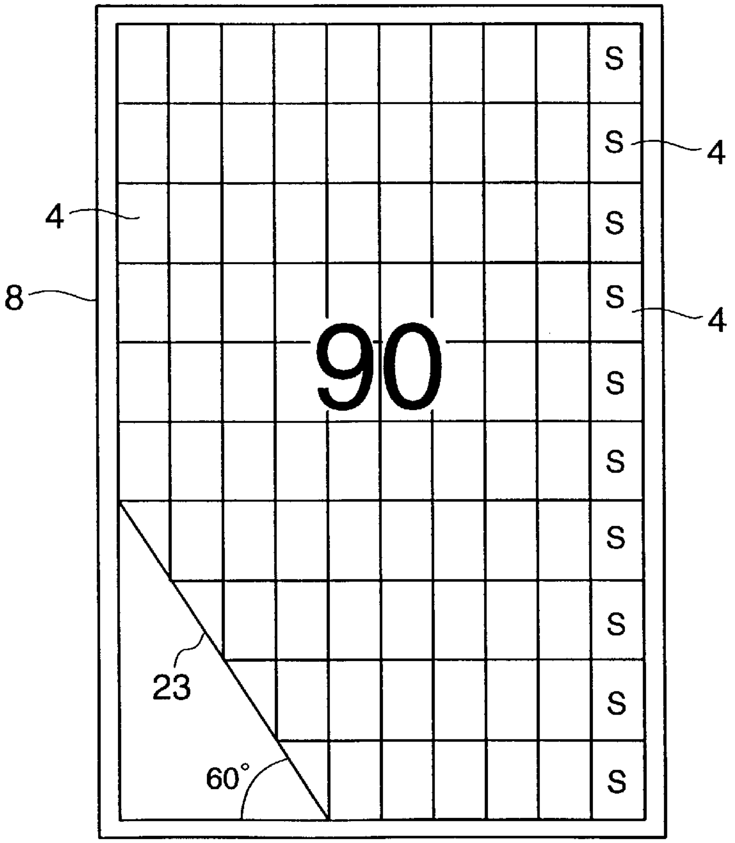
FIG. 8 is a front view of a main body side case storage part which stores only a small-capacity tablet case.
Figure 9:
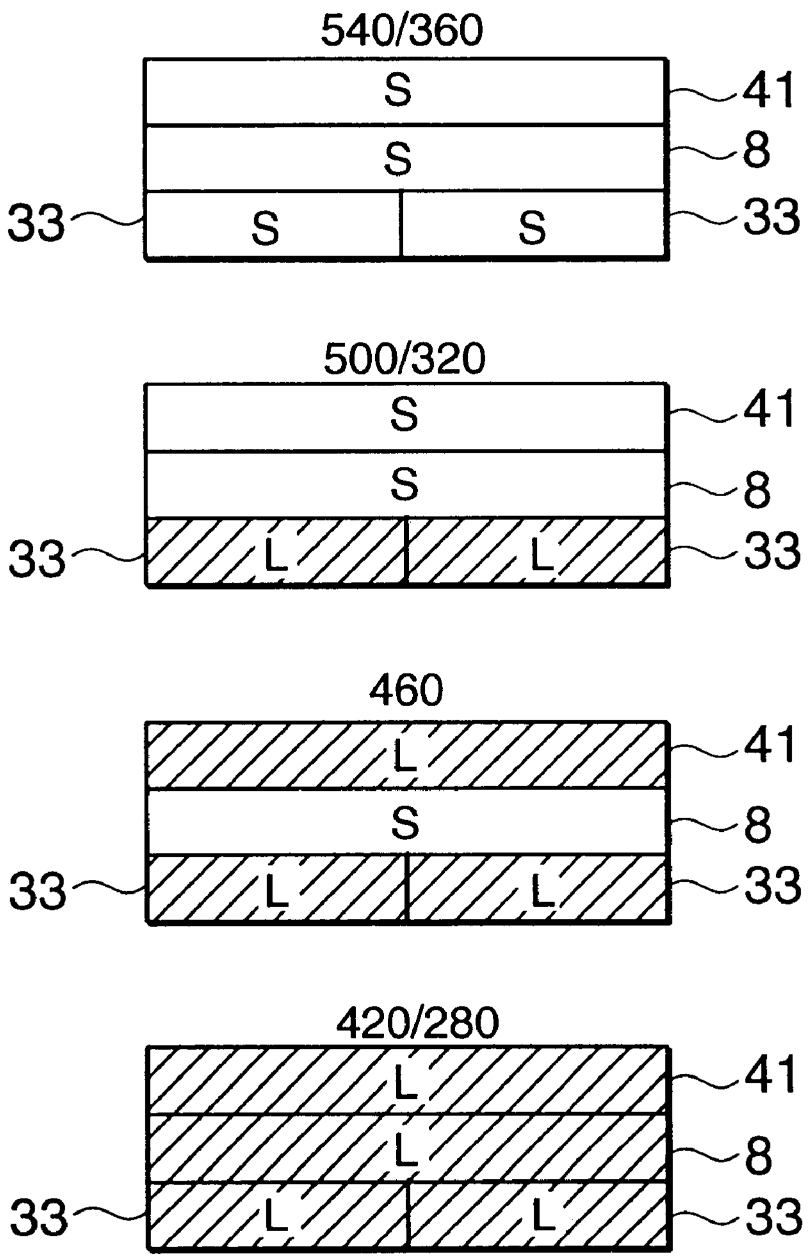
FIG. 9 is a diagram showing the storage modes of the large-capacity tablet case and small-capacity tablet case to the respective case storage parts of the medicine supply apparatus of the present invention.

Next, FIGS. 9 and 10 show the total capacity when the tablet cases 3, 4 are stored in the respective case storage parts 8, 33, 33, 41. Additionally, the door side case storage parts 33 can store 70 tablet cases 3 (FIG. 7), and 90 tablet cases 4, and the main body side case storage part 8 and the extension side case storage part 41 can store 140 tablet cases 3 (70×2), and 180 tablet cases 4 (90×2), respectively. Additionally, FIG. 8 shows the left half of the main body side case storage part 8, and corresponds to one door side case storage part 33.

In each drawing (1) shows that all the case storage parts 8, 33, 33, 41 store only small-capacity (S) tablet cases 4, and (2) shows that the door side case storage parts 33 store only the large-capacity (L) tablet cases 3 and the main body side case storage part 8 and extension side case storage part 41 store only the small-capacity (S) tablet cases 4. Moreover, (3) shows that the door side case storage parts 33, 33 and extension side case storage part 41 store only the large-capacity (L) tablet cases 3, and the main body side case storage part 8 stores only the small-capacity (S) tablet cases 4, and (4) shows that all the case storage parts 8, 33, 33, 41 store only the large-capacity (L) tablet cases 3.

In the above-described case (1) 540 (360 if there is no extension unit 9) tablet cases 4 can be stored, and in the case of (2) 500 (320 if there is no extension unit 9) tablet cases 3, 4 can be stored. Moreover, in the case of (3) 460 (320 if there is no extension unit 9) tablet cases 3, 4 can be stored, and in the case of (4) 420 (280 if there is no extension unit 9) tablet cases 3 can be stored.

Moreover, the medicine to be used by a relatively large amount is contained in the large-capacity tablet case 3, but when the case is stored in the main body side case storage part 8 or the extension side case storage part 41, during refilling with the medicine, the door units 2, 2 has to be frequently opened, or the extension unit 9 have to be opened, so that the operation becomes remarkably intricate. Moreover, when one case storage part stores the large-capacity tablet case 3 and small-capacity tablet case 4 in a mixed manner, the intervals of the shelves 26 need to be adjusted in accordance with the large-capacity tablet case 3, a gap is made above the small-capacity tablet case 4, and the capacity efficiency is deteriorated.

In consideration of these, it can be seen that the mode (2) (the door side case storage parts 33, 33 store only the large-capacity tablet cases 3, and the main body side case storage part 8 and extension side case storage part 41 store only the small-capacity tablet cases 4) is preferable for a so-called general hospital in which there are many medicine types to be handled, and the mode (4) (all the case storage parts 8, 33, 33, 41 store only the large-capacity tablet cases 3) is preferable for a single-department hospital in which there are less medicine types to be handled.

Figure 13:
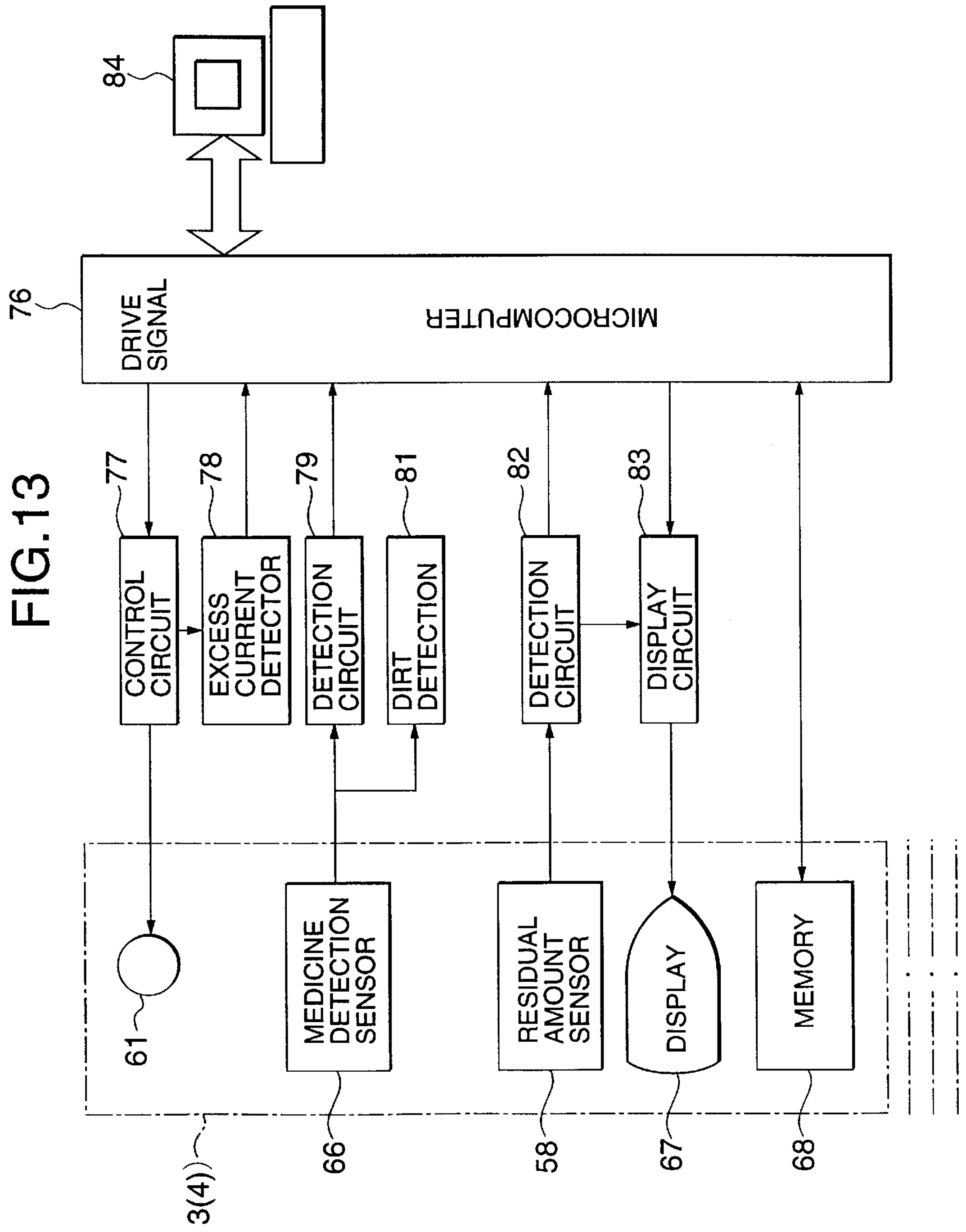
FIG. 13 is a block diagram showing the electric circuit of the medicine supply apparatus of the present invention.

Next, FIG. 13 is a block diagram showing the electric circuit of the medicine supply apparatus 1. Additionally, the packing machine or the shutter is omitted in this case. In the drawing, numeral 76 denotes a controller mounted on the main body 7, which is constituted of a general-purpose microcomputer. The controller 76 is connected to the motor 31 of the respective tablet cases 3, 4 via a control circuit 77. Numeral 78 denotes an excess current detection circuit for detecting the current supplied to the motor 31 via the control circuit 77, and its output is inputted to the controller 76.

The medicine detection sensor 66 of the tablet cases 3, 4 is connected to the controller 76 via a detection circuit 79. Moreover, numeral 81 is a circuit for detecting dirt on the medicine detection sensor 66. The residual amount sensor 58 of the tablet cases 3, 4 is also connected to the controller 76 via a detection circuit 82, and the display 67 is connected to the controller 76 via a display circuit 83. Moreover, the detection circuit 82 is also connected to the display circuit 83.

Furthermore, the memory 68 of the tablet cases 3, 4 which is constituted of a nonvolatile ROM is also connected to the controller 76. In this memory 68 the identification data of the tablet cases 3, 4, medicine code concerning the medicine types contained in the container 51, handled medicine numbers, and other ID information are written beforehand. Moreover, the controller 76 is connected to an external personal computer 84 via an RS-232C cable, and the like to perform the transmission/reception of data with this personal computer 84.

The use method and operation of the medicine supply apparatus 1 of the present invention in the above-described constitution will be described. Additionally, it is assumed that the respective shutters 12, 24, 39, 43 are closed when the power is turned on. Moreover, when the main body side case storage part 8, door side case storage parts 33, 33 of the respective door units 2, 2, and extension unit 9 are attached, the tablet cases 3, 4 containing the predetermined medicines are attached to the extension side case storage part 41 as described above.

Subsequently when the power of the medicine supply apparatus 1 is turned on, the controller 76 first scans the ID information of the stored tablet cases 3, 4 in the memory, and identifies and grasps the respective tablet cases 3, 4, the contained medicine types, and the like to constitute a database. This database is also outputted to the personal computer 84, and the personal computer 84 can also generate the database.

In this manner, the ID information on the tablet cases 3, 4 are written beforehand into the memory 68 of the tablet cases 3, 4, and the controller 76 identifies and grasps the information, so that even when the tablet cases 3, 4 are stored in any position of the case storage part, the medicine supply control can subsequently be realized without any incorrectness, and a so-called plug-in can be attained.

Figure 14:
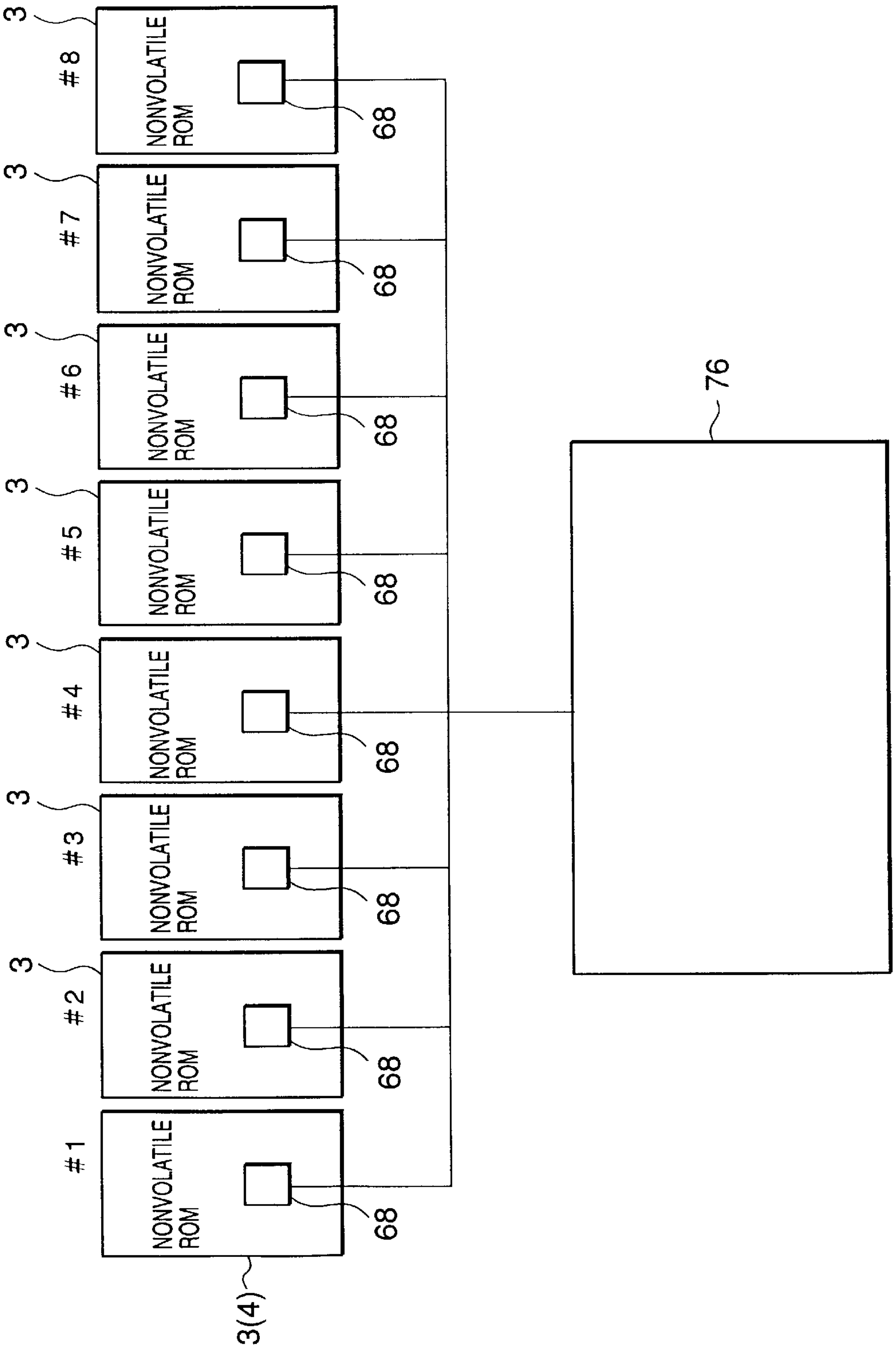
FIG. 14 is an explanatory view showing another tablet case recognizing operation of a controller.

Additionally, instead of the above-described constitution, as shown in FIG. 14, the positions (shown by #1 to #8 . . . in FIG. 14) in the case storage part for storing the tablet cases 3, 4 are predetermined, the address data concerning the positions (shown by #1 to #8 in FIG. 14) in the case storage part to store the tablet cases 3, 4 is written to the memory 68, and the data for identifying the respective positions #1 to #8 . . . may be set on the controller 76.

In this case, when the controller 76 scans as described above, the address data of the respective tablet cases 3, 4 is compared with actual storage positions, and in the case of incorrectness the display circuit 83 performs an alarm display (alarm) on the display 67 of the tablet cases 3, 4. Such constitution can also avoid incorrect medicine supply beforehand.

After the initial setting operation ends, the dispensing operation starts. Specifically, when an operator inputs prescription data via the personal computer 84 based on doctor's prescription, the controller 76 of the medicine supply apparatus 1 rotates forward the motor 61 of the tablet case 3 or 4 in which the medicines designated based on the prescription data are contained by the control circuit 77, and rotates (forward) the discharge drum 53 to discharge the medicines in the groove to the path 30 one by one.

In this case, the controller 76 receives a medicine detection signal from the medicine detection sensor 66 via the detection circuit 79, and counts the discharged medicines. Subsequently, the motor 61 is stopped when the predetermined amount is discharged. The discharged medicines enter the respective chutes 22, 37, 42, and are collected on the lowermost shutters 24, 39, 43.

Subsequently, the controller 76 opens the shutters 24, 39, 43, drops the medicines into the hopper 11, and collects the medicines on the shutter 12. Since the shutter 12 is structured to be inserted into a packing bag, the controller 76 then opens the shutter 12 to project the medicines into packing paper, and the medicines are packed by the packing machine 13 and subsequently fed to the outside via the taking port 14. In this case, when the medicines to be packed are present in the respective case storage parts 8, 33, 33, 41, the medicines are simultaneously discharged from the tablet cases 3, 4 of the respective case storage parts 8, 33, 33, 41, and packed simultaneously or when the shutters of the tablet case storage parts with the medicines discharged therefrom are opened. This can reduce the time required for the packing.

Figure 15:
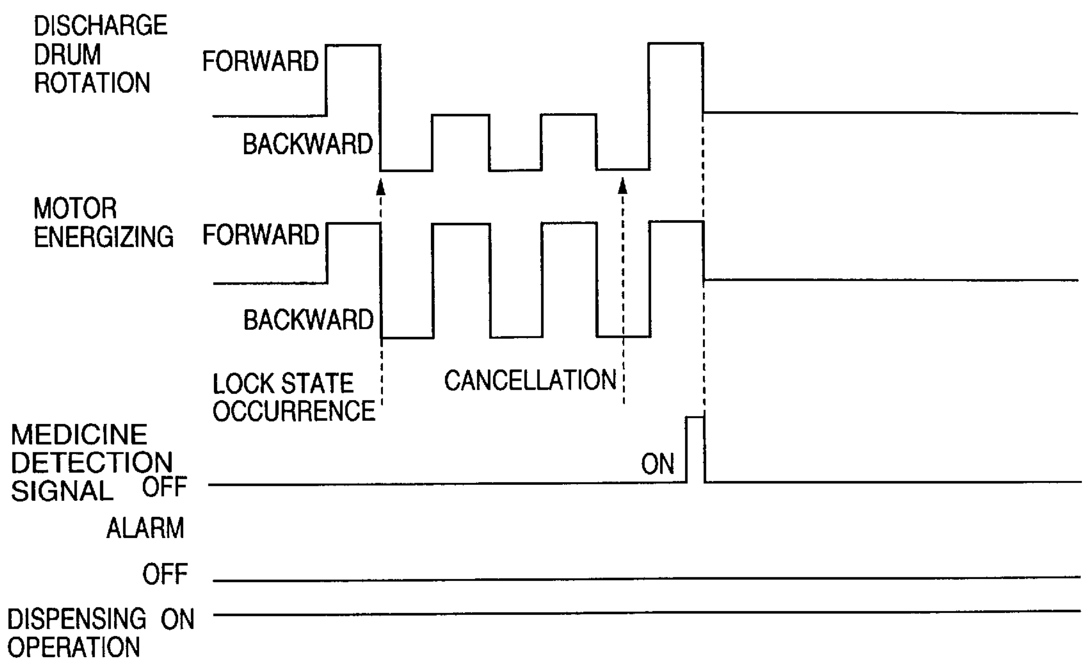
FIG. 15 is a timing chart showing the backward/forward rotating operation of a motor by a controller during medicine sticking.

When the medicines are held and stuck between the discharge port 69 and the discharge drum 53 during the dispensing operation, the motor 61 is locked, and an excess lock current flows. The controller 76 detects the lock state from the current supplied to the motor 61 by the excess current detection circuit 78. Subsequently, as shown in a timing chart of FIG. 15, at the time the lock state occurs the control circuit 77 rotates backward the motor 61 for a short period to rotate backward the discharge drum 53. Subsequently, the motor 61 is similarly rotated forward for a short period to rotate forward the discharge drum 53.

Figure 16:
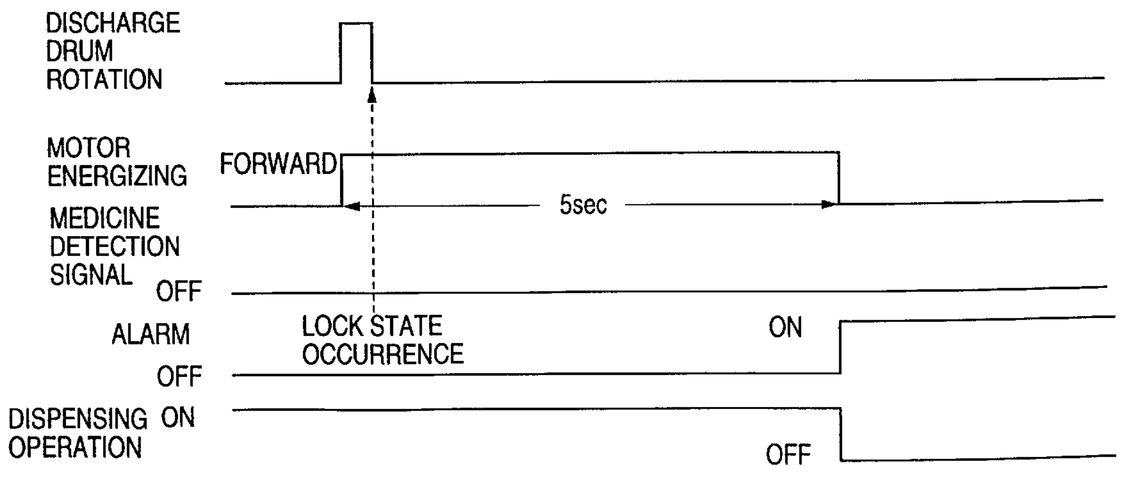
FIG. 16 is a timing chart showing a conventional control operation during the medicine sticking.

By repeating the backward/forward rotating operation several times, the stuck medicines drop (lock cancellation), the medicine detection sensor 66 generates (on) the medicine detection signal, and the controller 76 then returns the motor 61 to normal control (forward rotation) again. Additionally, in a conventional art as shown in FIG. 16, the dispensing operation stops five seconds after the occurrence of the lock state to generate the alarm, but by performing the short backward/forward rotation as described above, the sticking of the medicines can automatically be canceled to successively continue (on) the dispensing operation.

Additionally, when the medicine detection sensor 66 emits no medicine detection signal even after repeating the backward/forward rotation predetermined times, the controller 76 stops the dispensing operation, and the display 67 performs an alarm display (alarm) as described above.

Here, when by the dispensing operation the medicines in the containers 1 of the tablet cases 3, 4 decrease, and the residual amount lowers below the position where the residual amount sensor 58 Is attached, the output of the residual amount sensor 58 indicates H (L when the medicines are present). When the output of the residual amount sensor 58 indicates H, the detection circuit 82 ends the information to the controller 76 and to the display circuit 83, and the display circuit 83 displays the decrease of the residual amount, that is, performs the alarm display on the display 67.

Additionally, the controller 76 may Instruct the display circuit 83 to perform this display. Thereby, the operator grasps the decrease of the residual amount before the medicines are used up and can perform the refilling while supplying other medicines. Therefore, as compared with the case in which the dispensing operation is stopped after using up the medicines to perform the refilling, the operation efficiency is remarkably enhanced.

Here, the controller 76 detects the residual amount (emits light) by the residual amount sensor 58, for example, only during the operation of the discharge drum 53. This can minimize the adverse influence to the medicines by infrared rays emitted by the residual amount sensor 58 as compared with when light is always emitted.

POSSIBILITY OF INDUSTRIAL UTILIZATION

As described above in detail, according to the present invention, the medicine supply apparatus comprises a plurality of tablet cases stored in the main body case storage part, each tablet case includes the container for containing the medicine and provided with the discharge drum for discharging the medicine, and the drive table provided with the motor for driving the discharge drum, the transmission mechanism for transmitting the motor drive force to the discharge drum and the medicine detection sensor for detecting the medicine discharged from the discharge drum, and the drive table and container are detachably attached to the tablet case. Therefore, the main body side structure is simplified, and in the case of failure of the tablet case drive table, and the like the operation can be performed in the detached state from the container.

This improves the maintenance property of the tablet case, and also when the exchange is necessary, the exchange can be performed on each drive table or each container, so that the cost can be minimized.

Moreover, according to the present invention, in the medicine supply apparatus constituted by storing a plurality of tablet cases in the main body case storage part, each tablet case including the container for containing the medicine and the discharge drum for discharging the medicine from the container, the discharge drum of the tablet case is dislocated toward one lower side of the container. Therefore, by disposing the motor for driving the discharge drum on the other lower side of the container as described in claim 3 the motor can be accommodated in a dead space in the lower-face lower part on the other side of the container usually inclined toward the discharge drum. Thereby, the ineffective capacity can be reduced, and the entire dimension of the tablet case can be reduced while securing the capacity of the container. Therefore, the capacity efficiency of the tablet case can be improved, and as the entire medicine supply apparatus, the medicine containing ability can remarkably be enhanced without enlarging the installing space.

Furthermore, when one side of the container is set to the main body side, the path distance to the main body chute from the discharge drum can be shortened, so that the capacity efficiency can be improved by reducing the ineffective capacity, and the time required for discharging the medicine can be shortened.

What is claimed is:

1. A medicine supply apparatus comprising;

a plurality of tablet cases stored in a main body case storage part, each tablet case including a drive table detachably attached to a said tablet case on which is mounted a container also detachably attached to said tablet case for containing a medicine and provided with a discharge drum for discharging the medicine, a motor for driving said discharge drum, a transmission mechanism for transmitting drive force from said motor to said discharge drum and a medicine detection sensor for detecting the medicine discharged from said discharge drum, wherein said container and its discharge drum are detachably attached to said drive table.

2. A medicine supply apparatus as in claim 1 wherein the discharge drum of said tablet case is located at the bottom of one side of said container; and a motor for driving said discharge drum disposed below said bottom of said container offset from said one side.

3. A medicine supply apparatus comprising:

a main case body having a plurality of tablet cases stored in a main body case storage part, each tablet case including a container for containing a medicine, and a discharge drum for discharging the medicine from the container;

wherein the discharge drum of said tablet case is located at the bottom of one side toward one lower side of said container; and a motor for driving said discharge drum disposed below said bottom of said container offset from said one side.

4. The medicine supply according to claim 3 wherein said one side of said container is under a main case body side.

5. A medicine supply apparatus comprising:

a plurality of tablet cases stored in a main body case storage part, each tablet case including a container detachably attached to said tablet case for containing a medicine and provided with a discharge drum located at the bottom of one side of said container for discharging the medicine, a drive table detachably attached to said tablet case provided with a motor for driving said discharge drum disposed below said bottom of said container offset from said one side, a transmission mechanism for transmitting drive force from said motor to said discharge drum; and a medicine detection sensor for detecting the medicine discharged from said discharge drum.

* * * * *